US012808604B2

(12) United States Patent
Bini et al.

(10) Patent No.: US 12,808,604 B2
(45) Date of Patent: Nov. 24, 2026

(54) AIR CONDENSER FOR ORGANIC RANKINE CYCLE PLANTS

(71) Applicant: TURBODEN S.P.A., Brescia (IT)

(72) Inventors: Roberto Bini, Brescia (IT); Mariio Gaia, Brescia (IT); Isaia Casali, Brescia (IT)

(73) Assignee: TURBODEN S.p.A., Brescia (IT)

( * ) Notice: Subject to any disclaimer, the term of this patent is extended or adjusted under 35 U.S.C. 154(b) by 104 days.

(21) Appl. No.: 19/109,434

(22) PCT Filed: Sep. 5, 2023

(86) PCT No.: PCT/IB2023/058754
§ 371 (c)(1),
(2) Date: Mar. 6, 2025

(87) PCT Pub. No.: WO2024/052807
PCT Pub. Date: Mar. 14, 2024

(65) Prior Publication Data

US 2026/0098685 A1 Apr. 9, 2026

(30) Foreign Application Priority Data

Sep. 9, 2022 (IT) ........................ 102022000018375

(51) Int. Cl.
*F28B 1/06* (2006.01)
*F28B 9/08* (2006.01)
(Continued)

(52) U.S. Cl.
CPC .................. *F28B 1/06* (2013.01); *F28B 9/08* (2013.01); *F28B 9/10* (2013.01); *B01D 5/0003* (2013.01);
(Continued)

(58) Field of Classification Search
CPC ...... F28B 1/06; F28B 9/08; F28B 9/10; F28B 2001/065; F28D 1/05325; B01D 5/0003; B01D 5/009
(Continued)

(56) References Cited

U.S. PATENT DOCUMENTS 4,548,262 A * 10/1985 Hull .......................... F28B 9/08
165/DIG. 198
5,056,592 A * 10/1991 Larinoff .................... F28B 1/06
165/111
(Continued)

FOREIGN PATENT DOCUMENTS

CS 243531 B1 * 6/1986
KR 20230154218 A * 11/2023 ................ F28B 1/06

*Primary Examiner* — Terrell L Mckinnon
(74) *Attorney, Agent, or Firm* — R. Ruschena Patent Agent, LLC

(57) ABSTRACT

An air condenser for an organic Rankine cycle plants which includes a two-pitch tube bundle in which in the first pitch the condensation of the working fluid takes place up to a steam content in any case greater than zero and in the second pitch only the residual steam flow rate of the working fluid not condensed in the first pitch is condensed. The second pitch is inclined upwards and is provided with an opening for the extraction of incondensable gases. Preferably, the second pitch is located in a position above the first pitch on a position parallel to that of the first pitch. The innovative air condenser is particularly suitable for non-cogenerative organic Rankine cycle plants.

14 Claims, 5 Drawing Sheets

(51) Int. Cl.
*F28B 9/10* (2006.01)
*B01D 5/00* (2006.01)
*F28D 1/053* (2006.01)

(52) U.S. Cl.
CPC ........ *B01D 5/009* (2013.01); *F28B 2001/065* (2013.01); *F28D 1/05325* (2013.01)

(58) Field of Classification Search
USPC .......................................................... 165/113
See application file for complete search history.

(56) References Cited

U.S. PATENT DOCUMENTS 5,056,593 A * 10/1991 Hull .......................... F28B 1/02
165/111
5,787,970 A * 8/1998 Larinoff .................... F28B 9/10
165/110
5,950,717 A * 9/1999 Fay ........................... F28B 1/06
165/113

* cited by examiner

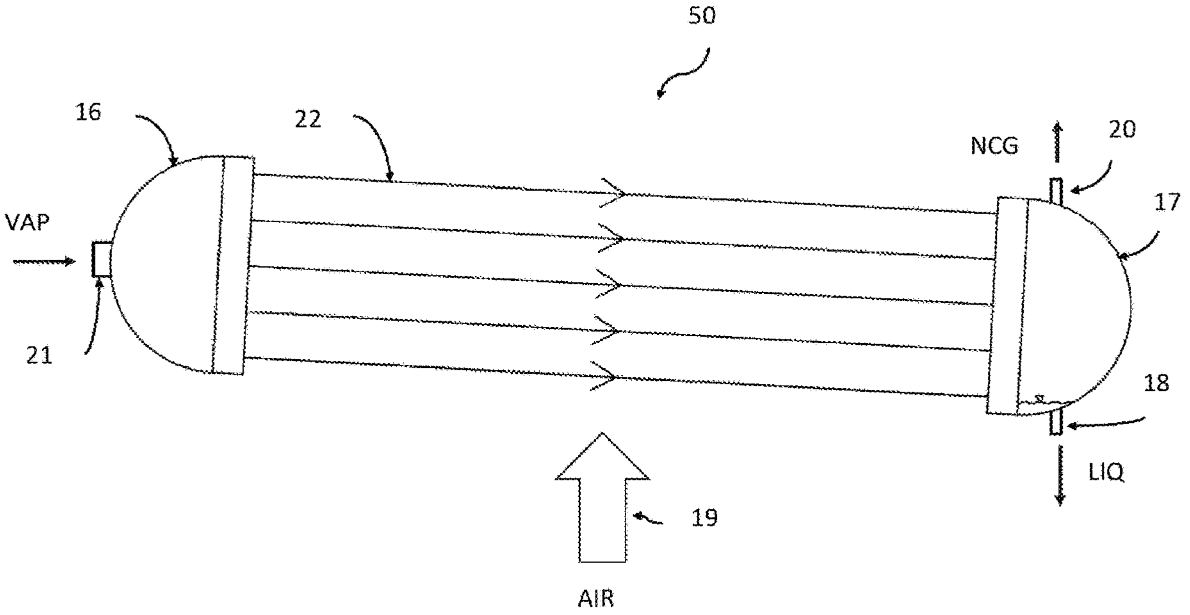
Fig. 1 – Prior art
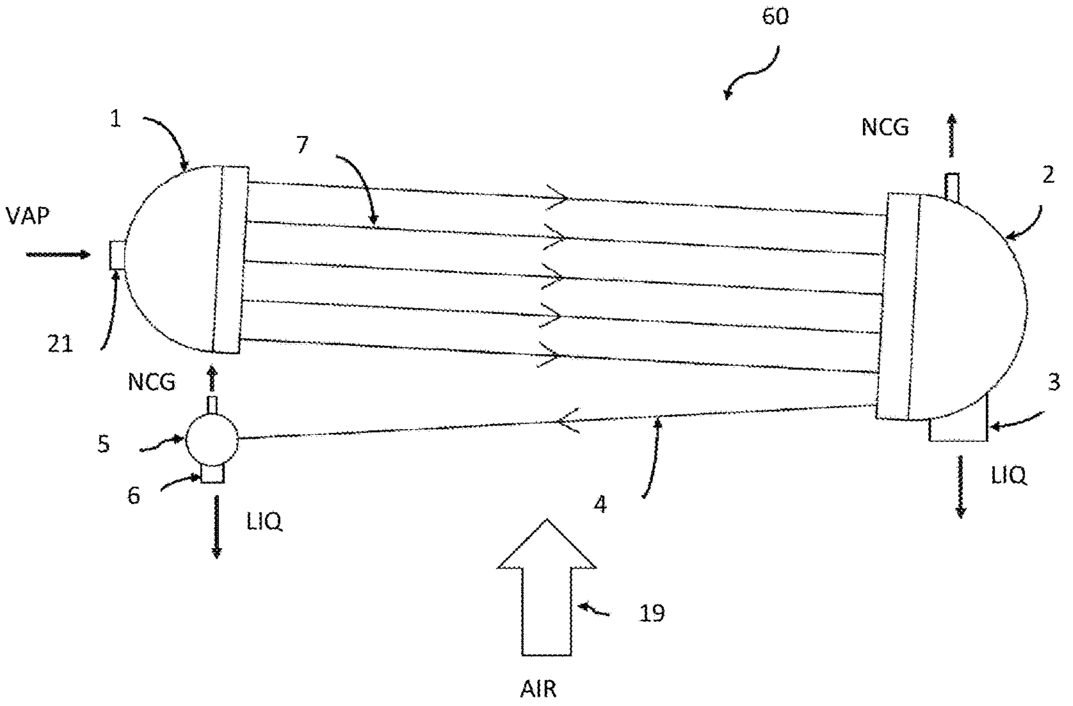
Fig. 2 – Prior art

AIR CONDENSER FOR ORGANIC RANKINE CYCLE PLANTS

RELATED APPLICATIONS

This is a national stage application of PCT application PCT/IB2023/058754 having an international filing Date of Sep. 5, 2023. This application claims foreign priority based on application 102022000018375 of Italy, filed on Sep. 9, 2022.

BACKGROUND OF THE INVENTION

1. Field of the Invention

The present invention relates to an air condenser for organic Rankine cycle plants. The solution adopted for the innovative air condenser is particularly suitable for non-cogenerative organic Rankine cycle plants.

2. Brief Description of the Prior Art

As is known, a thermodynamic cycle is defined as a finite succession of thermodynamic transformations (for example isotherms, isochores, isobars or adiabatics) at the end of which the system returns to its initial state.

This cycle can be direct, for example a direct Rankine cycle, in which a thermal source is used for the production of mechanical/electrical energy and heat at a lower temperature than that of the thermal source.

In particular, an ideal Rankine cycle is a thermodynamic cycle composed of two adiabatic transformations and two isobars. In the case of a direct cycle, its purpose is to transform heat into work. This cycle is generally adopted especially in thermoelectric power plants for the production of electricity and uses water as a driving fluid, both in liquid form and in the form of steam, with the so-called steam turbine.

More specifically, organic Rankine cycles (ORC) have been hypothesized and created which use high molecular mass organic fluids for the most different applications, in particular also for the exploitation of low-medium enthalpy thermal sources. As in other steam cycles, the plant for an ORC cycle includes one or more pumps for feeding the organic working fluid, one or more heat exchangers for carrying out the preheating, vaporization and possible overheating or heating phases in supercritical conditions of the same working fluid, a steam turbine for the expansion of the fluid, mechanically connected to an electric generator, a condenser which returns the organic working fluid to the liquid state and a possible regenerator for recovering the heat downstream of the turbine and upstream of the condenser.

In a large number of ORC plants that use organic fluid turbogenerators to produce energy from renewable sources or industrial heat recovery, the cycle condenser is made with an air condenser. In cogeneration applications the condensation temperature is kept high enough to satisfy the thermal user and the condenser is preferably cooled by water which is a more effective heat carrier for transferring the heat from generation to user, even through a long distribution network such as a district heating network.

On the contrary, in non-cogeneration applications, there is no need to use the heat discharged from the condenser but it is required to discharge the heat into the environment at the lowest possible temperature (therefore with a small temperature difference compared to the ambient temperature).

For this reason, air condensers are used which generally include a series of condensing tubes fed in parallel, with the fluid to be condensed inside the tubes and the cooling air, moved by fans, which is transversally in contact with the condensing tubes.

In most applications the full flow rate of fluid to be condensed is divided over a certain number of condenser bays, each of which may be composed of one or more tube bundles.

SUMMARY OF THE INVENTION

The solution of the technical problems referred to in the previous paragraph is obtained, according to the present invention, with an air condenser for ORC plants which includes a two-pitch tube bundle in which in the first pitch the condensation of the working fluid takes place up to a steam content in any case greater than zero and in the second pitch only the residual steam flow rate of the working fluid not condensed in the first pitch is condensed. The second pitch is inclined upwards and is provided with an opening for the extraction of incondensable gases. Preferably, the second pitch is located in a position above the first pitch on a position parallel to that of the first pitch.

According to one aspect of the present invention, an air condenser for an organic Rankine cycle plant is therefore described, having the characteristics set out in the independent product claim attached to the present description.

Further preferred and/or particularly advantageous ways of implementing the aforementioned plant are described according to the characteristics set out in the attached dependent claims.

BRIEF DESCRIPTION OF THE DRAWINGS

The invention will now be described with reference to the attached drawings, which illustrate some non-limiting examples of implementation of the air condenser, in which:

FIG. 1 schematically shows an example of a single-pitch tube bundle of an air condenser, according to the known technique, FIG. 2 schematically shows an example of a two-pitch tube bundle of an air condenser, again according to the known technique, FIG. 3 schematically shows a two-pitch tube bundle of an air condenser, according to an aspect of the present invention, FIGS. 4*a* and 4*b* schematically show a two-pitch tube bundle of an air condenser, according to two further aspects of the present invention, FIG. 5 schematically represents the two-pitch tube bundle of FIG. 3 integrated into the air condenser, FIG. 6 schematically shows a first solution to define a section dedicated to the transport of the condensate.

DETAILED DESCRIPTION OF THE INVENTION

Figure 3:
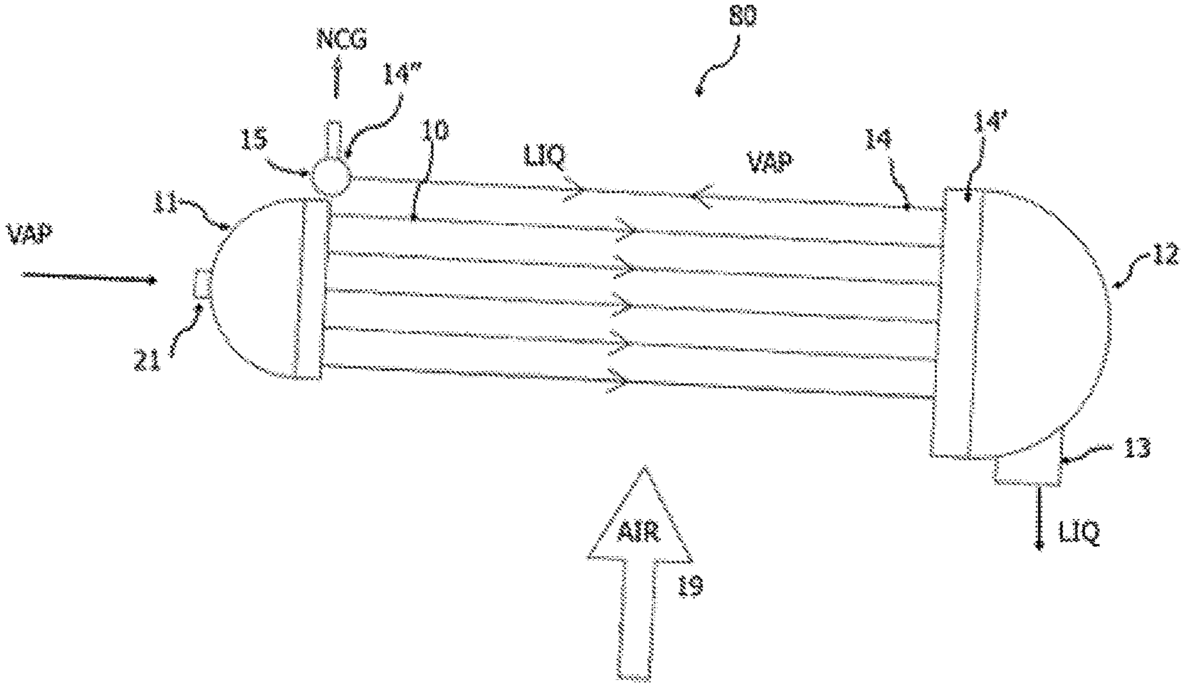

With reference to FIGS. 1 and 2, the known solutions used for the condensation of organic fluids in ORC plants can be described considering the single tube bundle, as the operating conditions of the single tube bundle are representative of the overall functioning of the condenser.

In FIG. 1 a solution of a tube bundle 50 with one pitch is schematically shown: the entire flow rate of working fluid to be condensed associated with the tube bundle flows through a supply tube 21 into an inlet manifold 16 and therefore into a plurality of tubes in parallel which constitute the only pitch 22 of the tube bundle 50, proceeding from left to right and from top to bottom, according to FIG. 1. In fact, in order to facilitate the discharge of the liquid, the tube bundle is installed with a certain slope.

Outside the tube bundle, one or more fans (not shown in the figure) convey the air (schematized by arrow 19) in ambient conditions for being transversely in contact with the surface of the tubes of the tube bundle. The tubes are generally finned on the external surface, for example, by means of an aluminum fin wrapped around the tube, to improve the exchange with the external air.

As the steam condenses along its path inside the tubes, a flow of condensed liquid is formed. At the outlet of the tubes, the flow of condensed liquid is collected in an outlet manifold 17 and is then sent back through the tube 18 to the ORC plant circuit by means of a feed pump (not shown in the figure).

The single-pitch condenser, or tube bundle, solution, despite its simplicity, presents an intrinsic defect linked to the fact that the condensed liquid has a non-negligible degree of sub-cooling compared to the condensation temperature of the steam. In fact, all the steam must condense within the single path (pitch) of the tube bundle and therefore must have zero value at the exit of each tube. To guarantee a zero steam content, only liquid will flow in the final section of the tube bundle. This liquid is in contact with the cold surface of the tube (the temperature of which is closer to the temperature of the ambient air that touches it rather than the condensation temperature of the steam) and therefore cools further, i.e. it under-cools. This happens in particular for the liquid that flows in the lower row of tubes, i.e. the first to be touched by the air which will have a temperature equal to the ambient temperature, having not yet been heated as a result of crossing the tube bundle.

To reduce under-cooling, some practical measures are known, for example, reducing the number of fins on the outside of the tubes of the lower rows of the tube bundle, those which are hit by the coldest air. However, the phenomenon cannot be significantly reduced as in this type of one-pitch solution the title of the steam at the exit of the tubes, as mentioned, must be equal to zero and therefore near the exit of the tubes there will still only be liquid which in any case undergoes under-cooling, as explained above.

It should be noted that the presence of incondensable gases further worsens the phenomenon described, so ORC plants often have a incondensable suction system 20 which for the one-pitch solution is usually placed in the upper portion of the outlet manifold.

The problem of under-cooling of the liquid is not negligible as it reduces the overall efficiency of the thermodynamic cycle as the undercooling heat must then be further supplied to the working fluid from the thermal source and therefore a portion of the inlet heat to the thermodynamic cycle is used to compensate for this "unwanted" heat removal occurring in the condenser.

FIG. 2 shows a two-pitch tube bundle solution, through which the under-cooling problem is almost completely solved. The tube bundle 60 includes a feeding tube 21, an inlet manifold 1, a first pitch 7 made up of a first plurality of tubes, an intermediate manifold 2 in which the separation of the liquid phase takes place, drained through the nozzle 3 and a second pitch 4 consisting of a second plurality of tubes in which only the residual steam flow rate not condensed in the first pitch is processed. Therefore, the liquid condensed in the first pitch has no way to be under-cooled. The liquid exiting the first pitch is practically free from under-cooling as at the exit from the first pitch the steam content is not yet equal to zero and therefore there is still equilibrium between the liquid and vapor phases and the temperature is therefore that of condensation of steam. The condensate of the second pitch is collected in an outlet manifold 5 and drained from the nozzle 6. This second pitch could generate under-cooled liquid but for a liquid flow rate significantly lower than the total one, as most of the liquid has been removed from the intermediate manifold 2 through the nozzle 3.

In this solution, an effective removal of incondensables (indicated with NCG in FIG. 2) requires extracting them both from the intermediate manifold 2 and from the outlet manifold 5. In the outlet manifold 5 the condensed liquid is extracted in the second pitch while the steam flow rate is practically zero, which allows the incondensables to accumulate and be conveniently extracted. On the contrary, in the intermediate manifold 2 of the two-pitch solution, the steam content is not equal to zero and therefore together with any incondensable gases, a flow rate of working fluid still in the vapor phase would also be extracted. On the other hand, incondensable gases could also remain "trapped" in this area of the condenser, so it is correct to provide for extraction from this area too, delegating the separation of any organic fluid aspirated to a specific external separator.

In addition to the problem of a more complex extraction of incondensables, this solution has other drawbacks, mainly in terms of cost and size. In both pitches the tubes must be inclined to drain the liquid inside. While in the one-pitch solution of FIG. 1 the tube bundle 50 is constructed with straight and parallel tubes and the inclination is entrusted to the support structure, in the two-pitch solution of FIG. 2 the tube bundle 60 is usually mounted horizontally but at its internal, the first pitch of tubes 7 and the second pitch of tubes 4 must have opposite inclinations. This means that the overall height of the tube bundle is significantly greater. For example, the tubes could have a length of 18 meters and a slope of 2°, which entails a difference in height between the entrance and exit of each row of tubes of approximately 0.6 m, so with at least 0.6×2=1.2 m of greater height of the tube bundle due to the only effect of the opposing slopes of the tubes are required. Furthermore, it is necessary to provide 2 "piping" lines for the removal of the liquid as this accumulates in two manifolds 2, 5 which are very distant from each other.

There is, therefore, a need for a design solution for the air condenser that solves or at least mitigates the drawbacks mentioned above.

Figure 4A:
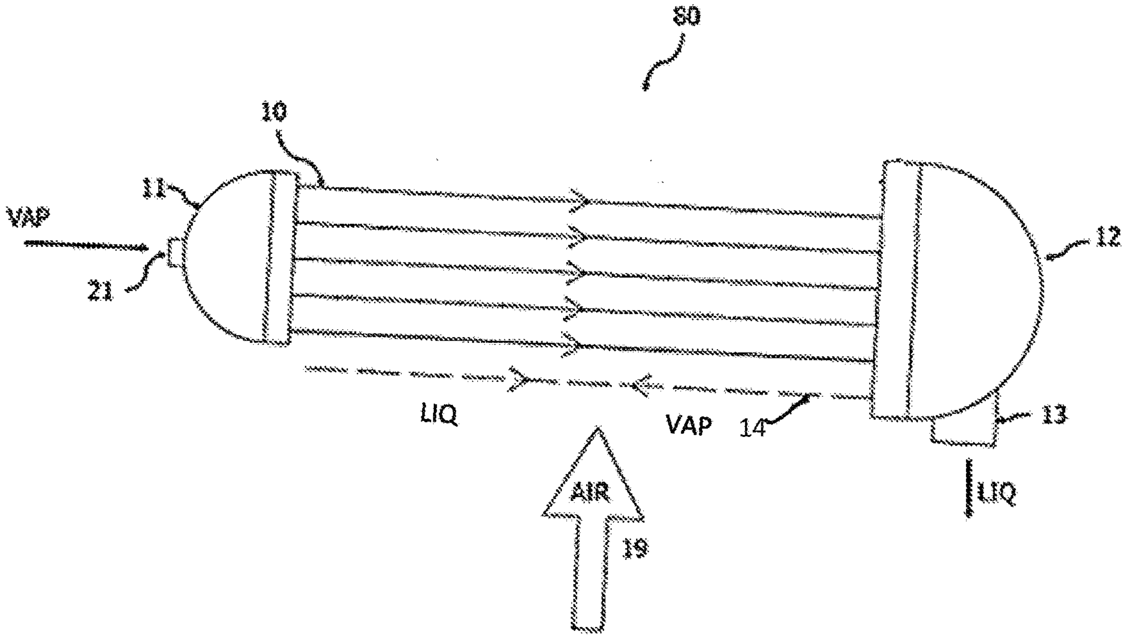
Figure 4B:
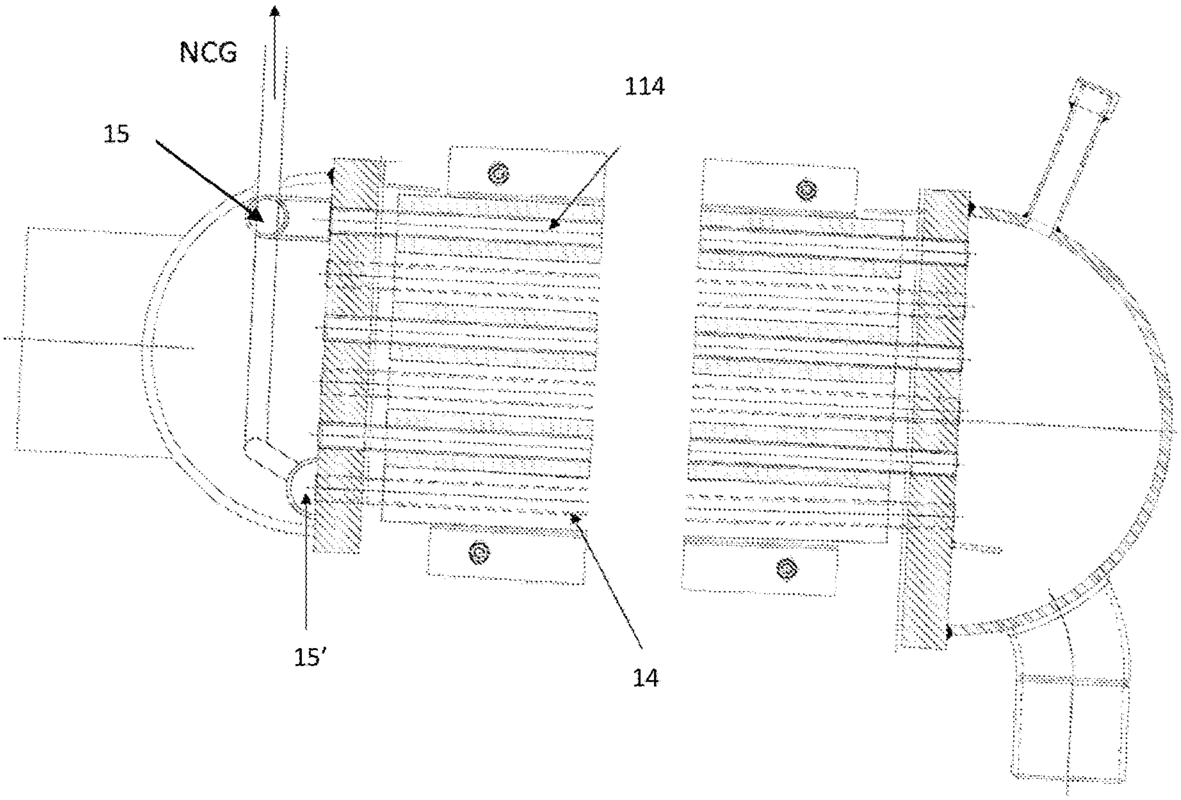
Figure 5:
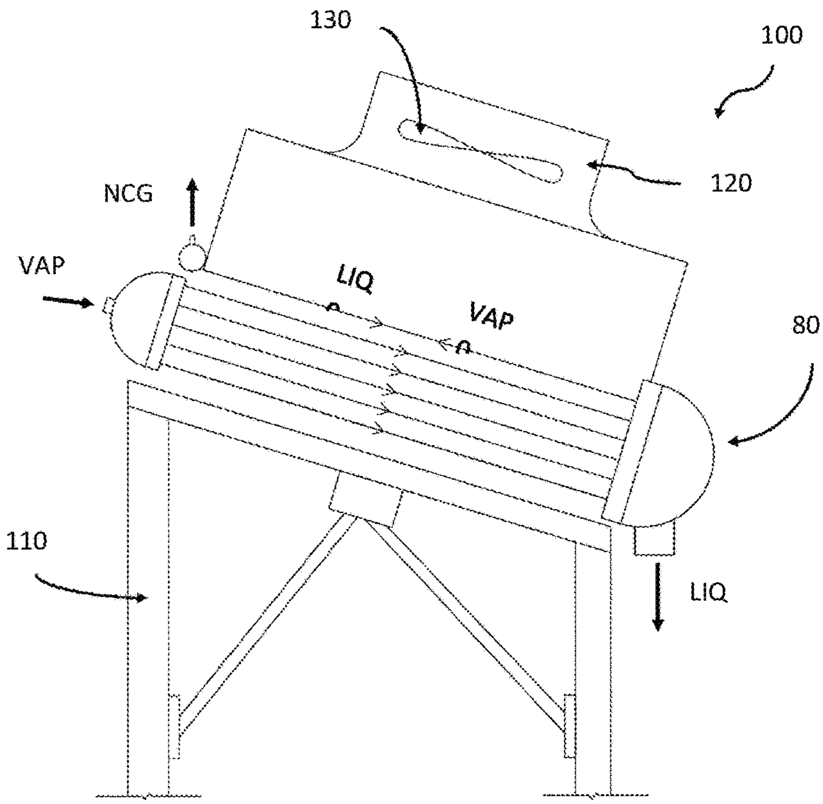

Referring to FIGS. 3 to 5, a two-pitch tube bundle 80 for an air condenser 100 for ORC plants includes at least a supply tube 21 (only one in the exemplary figures), an inlet manifold 11, a first pitch 10 comprising a first plurality of tubes in which the working fluid is condensed up to a steam content in any case greater than zero, an outlet manifold 12 in which the separation of the liquid phase occurs, drained through at least one nozzle 13 (only one in the exemplary figures), and sent to a condensate manifold **13*a* (which can be seen in FIG. 6) and a second pitch 14** comprising a second plurality of tubes in which only the residual steam flow rate not condensed in the first pitch is processed.

According to the present invention, the second pitch 14 is preferably located in a position above the first pitch, along a position parallel to that of the first pitch.

Furthermore, the second pitch ends with a further manifold 15 the task of which is to accumulate the incondensable gases (NCG, incondensable gas in English) due to the fact that said further manifold 15 represents:

- the only high point of the tube bundle 80 and therefore suitable for accumulating the NCGs which have a lower density than that of the vapor of the working fluid,
- a real calm room,
- the area in which the extraction of NCGs from the process is truly effective.

In the second pitch 14, therefore, the following occurs:

- the condensation of the steam residual flow rate not completely condensed during the crossing of the first pitch 10, in which the steam travels upwards through the tube, as it is pushed by the lower pressure existing in the further manifold 15, or by a positive pressure differential existing between a first end 14' upstream of the second pitch 14 and a second end 14" downstream of the second pitch 14, the drainage of the condensed residual liquid which flows downwards by gravity falling into the outlet manifold 12.

Advantageously, the condensed liquid is drained only by at least one nozzle 13 and, therefore, a double "piping" system is not necessary to lead it back into the ORC plant. If the second pitch 14 is in a position above the first pitch, a suitable point will be available for the extraction of incondensable gases, i.e. the second end 14" of the second pitch 14: in fact, this end is the top of the condenser where the concentration of incondensable gases is greater. Therefore, from the second pitch 14—more precisely, from its second end 14"—no condensate is extracted but only incondensable gases, with a possible small percentage of working fluid in the vapor state.

All this occurs even if the tube bundle 80 retains the same advantages as the known solution in FIG. 2, i.e. it practically avoids any under-cooling of the liquid. In fact, as for the known two-pitch solution of FIG. 2, the under-cooling is reduced to a minimum due to the fact that the condensed liquid fraction is drained at the exit of the first pitch 10 when the vapor content is greater than zero, but also due to the fact that the row of tubes of the second pitch 14 is hit by the warmer air being in a position above the first pitch (and is not hit directly by the air at room temperature as in the example of FIG. 2).

In order to facilitate the drainage of the liquid, the entire tube bundle, built with parallel tubes, is mounted inclined due to the support structure 110 of the condenser 100, as in the case of the one-pitch configuration in FIG. 1 and differently from the two-pitch configuration in FIG. 2.

Therefore, the tube bundle 80 according to the present invention is therefore as compact as the one-pitch one, as it does not have to house rows of tubes with opposite inclinations inside it.

Alternatively, the tube bundle 80 could be equipped with a second pitch underneath the first pitch 10 or in parallel with the first pitch 10. Solutions are also possible, such as the one illustrated in FIG. 4*a*, in which the tube bundle 80 includes a second pitch 14 underneath the first pitch 10.

Furthermore, hybrid solutions are also possible, for example the one illustrated in FIG. 4*b*, which is useful when the temperature difference between air and working fluid is very high and therefore the first pitch would be exited with a vapor content close to zero. In this case, a second main pitch 14 is provided, underneath the first pitch 10 and on a position parallel to the position of the first pitch, and a second auxiliary and partial pitch 114, parallel to the upper row of the first pitch 10. For example, the upper row will be created as follows: n total tubes, y second-pitch tubes and n-y first-pitch tubes, with, for example, y=2. The NCGs will be drawn from a first manifold 15' at the end of the second main pitch 14 and from a second manifold 15 at the end of the second auxiliary pitch 114.

The second main pitch 14, in a position underneath the first pitch 10, has the advantage of preheating the air. In this way the air that reaches the lower row of tubes of the first pitch (therefore after having already hit the second pitch 14) is already preheated and therefore total condensation of the vapor exiting the first pitch is avoided. Therefore, a too rapid condensation of the vapor and the potential creation of pockets of NCGs trapped within the liquid are avoided.

At the same time, the second pitch 114, in parallel to the upper row of the first pitch 10, allows maintaining the already mentioned advantage of having the second pitch in the most convenient position for collecting the NCGs which, being less heavy than the working fluid vapors, stagnate at the top of the manifold of the first pitch.

With reference to FIG. 5, the air condenser according to the present invention therefore includes the tube bundle 80, as described above, a support structure 110 which allows the inclined positioning of the tube bundle 80, an air duct 120 which pitches through the tube bundle 80 and at the exit assumes a temperature slightly higher than the ambient temperature, a fan 130 which sucks the aforementioned air which carries out the heat exchange with the working fluid to be condensed.

After having devised this solution, the writer also solved a further potential technical problem that this solution could entail. In fact, as in the second pitch the steam and the liquid have opposite directions, the steam could interfere with the drainage of the tubes. The finite elements fluiddynamic analyzes have not given evidence of this problem, but the writer nevertheless deems it appropriate to propose some solutions, in the event that the real behavior of the fluids differs from what is simulated.

A solution to this problem is to define within the second pitch 14 a section 141 transverse to the axis of an exchange tube 140 of the second pitch 14, located in the lower portion of the exchange tube, in which section the liquid mainly collects.

Figure 6:
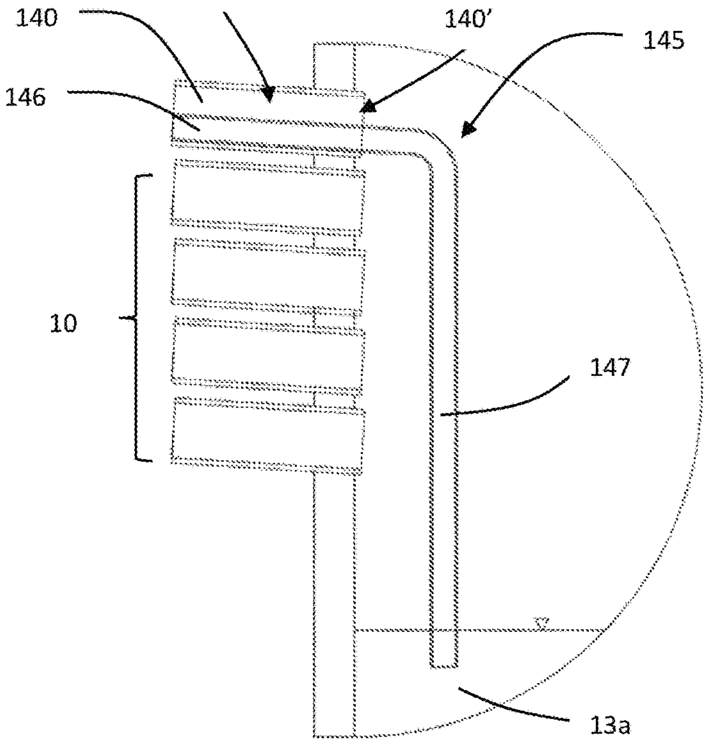
Figure 7:
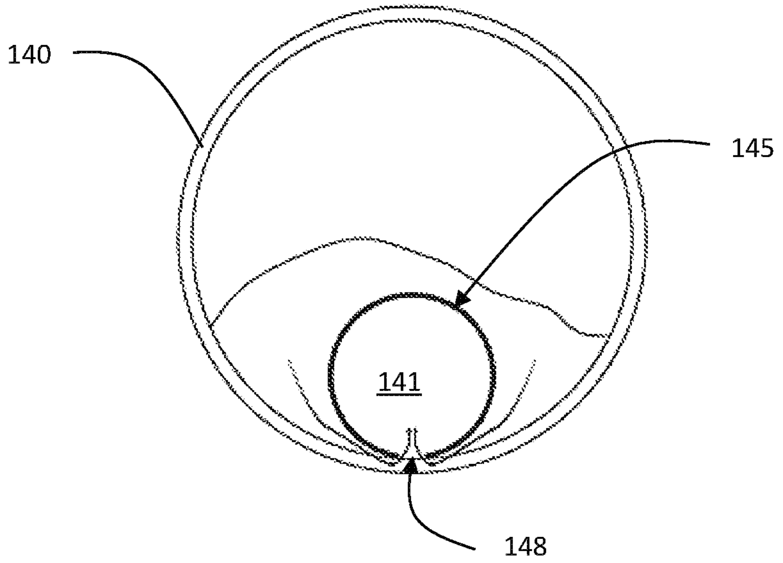
FIG. 7 is a detail of the solution of FIG. 6, and FIG. 8 schematically shows a second solution to define a section dedicated to the transport of the condensate.
Figure 8:
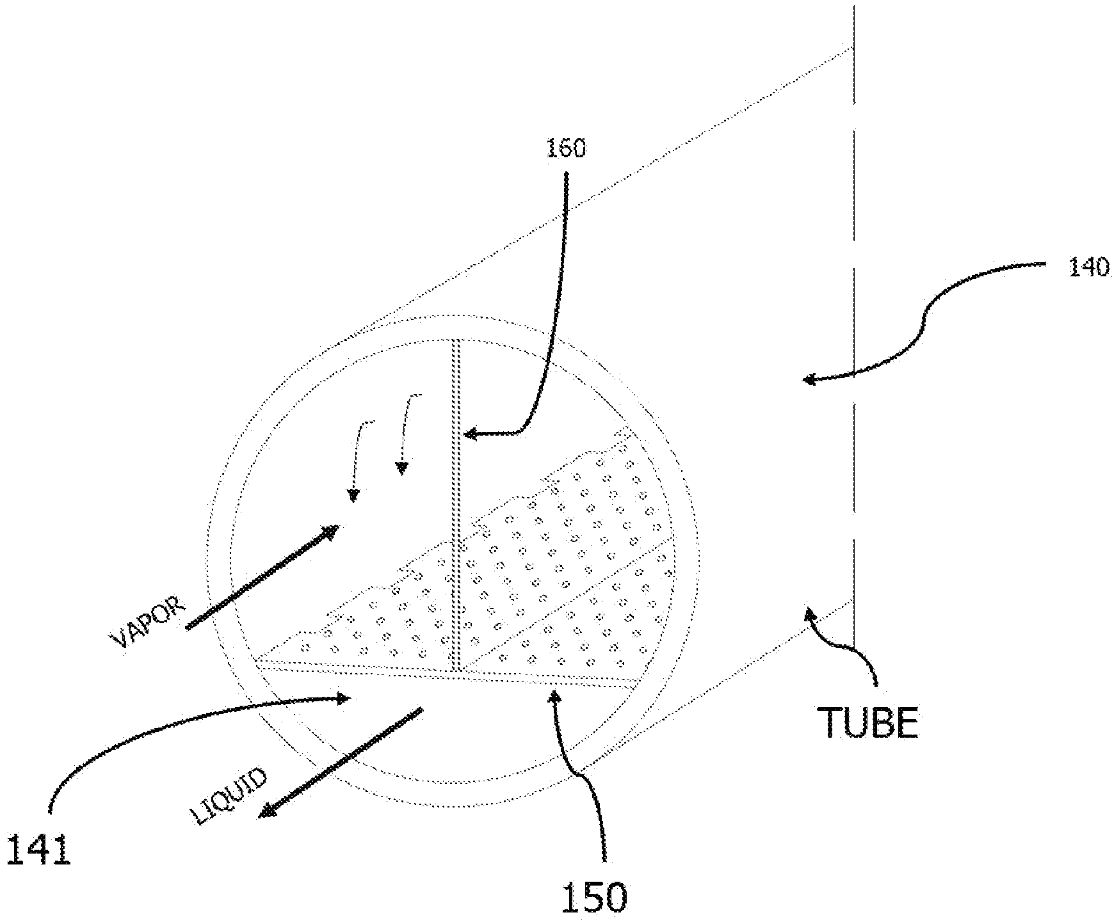

With reference to FIGS. 6 and 7, a non-limiting example of the cross section 141 is created by a small draining tube 145 positioned along the axial direction with respect to a generic exchange tube 140 of the second pitch 14 and inserted into it with a parallel axis and resting on it. The section 141 therefore coincides with the straight section of the small draining tube 145.

The small draining tube 145 includes a first portion 146 inserted into the exchange tube 140 and which ends at the end 140' of the tube 140 and a second portion 147, continuous with respect to the first portion, which begins at the end 140' of the tube 140 and ends under the liquid head of the condensate manifold 13*a*.

The small draining tube 145, which is less rigid than the exchange tube 140 which contains it, has a diameter of approximately one third compared to the exchange tube 140, and is characterized by an opening 148, created substantially at the point of tangency between the exchange tube 140 and the small draining tube 145, to allow the condensate to enter.

The liquid inlet opening 148 is under the head, so as to ensure the entry of only the condensate and not of the steam inside the small draining tube 145. The latter, therefore, will have the function of separating the liquid phase from the steam which, as previously specified, has the opposite direction to it. The liquid entering the small draining tube 145 can descend by gravity, with the inclination foreseen by the tube bundle 80, i.e. the same as the tube that contains it. According to this solution, the steam is prevented from accessing the inside of the small draining tube 145 for two reasons: the first one is due to the fact that the end of the tube is located under the head, so therefore it can only allow the entry to the liquid, the second reason is the non-continuity of the opening 148 along the entire small draining tube 145: this opening is in fact only present in the first portion 146 of the small draining tube 145, the one inserted in the tube 140, while it is not present in the second portion 147 of the small draining tube 145, this for ensuring that no steam enters it.

In this way the steam, which rises in counter-flow with respect to the liquid, is prevented from creating so-called pockets which cause the liquid to stagnate in its drainage path, and consequently its under-cooling is avoided. A further advantage of this solution, in addition to the purely hydraulic one described so far, is that of protecting the condensate from under-cooling, as the liquid inserted into the small tube touches the exchange tube at only one point, i.e. the tangential one, between the small tube and the tube 140, considering the front section of this system, as a consequence of the geometry of this solution.

Advantageously, the small draining tube 145 could have a reduced length, i.e. it could comprise a single portion inserted into the exchange tube 140 which ends well before the end 140' of the exchange tube 140.

In fact, the phenomenon of a liquid stagnation, caused by the thrust of rising steam, occurs approximately for steam speeds above a certain threshold which mainly depends on the type of fluid. However, the speed of the steam decreases along the way, due to its condensation which occurs in the second pitch; it is therefore possible to think of defining a length of the small draining tube 145 that reaches only the "critical" portion, i.e. the one affected by higher steam speeds. By operating in this way, the small draining tube 145 would only affect a portion of the exchange tube 140 of the second pitch, in other words the axial length of the small draining tube 145 will be less than the axial length of the exchange tube 140.

This solution entails several advantages compared to the previous one:

- lower weight of the small tube and, consequently, lower cost,
- lower risk of twisting and deformation of the small tube,
- greater probability that the small tube will always remain below the level of the liquid, consequently reducing the risk of steam entering inside it.

To fix the small draining tube 145 and prevent it from moving axially downwards, any joining means can be used.

Possibly, the sole support on the exchange tube 140 could be sufficient to prevent, due to static friction, the axial slipping of the tube.

Alternatively, the small tubes of the second pitch 14 can be fixed together, directly or by means of an internal structure which is in turn integral with the walls of the condensate manifold 13*a*.

An alternative solution to the small draining tube 145 could consist of inserting into the exchange tube 140 of the second pitch 14 a draining sheet 150, for liquid-vapor separation, which keeps sufficiently isolated the cross section 141 in which the condensed liquid flows (downwards) from the vapor zone (in which the vapor 'blows' upwards), so that the liquid does not suffer (or only suffers to a significantly reduced extent) the counter-flow dragging of the vapor. Therefore the cross section 141 in this case is delimited by the draining sheet 150 and by the walls of the exchange tube 140, underlying the draining sheet 150.

Preferably, the draining sheet could be a perforated sheet 150 which is inserted into the tube 140, in a horizontal position, before this in turn is mounted in the second pitch 14 of the tube bundle 80.

Advantageously, in order to force the perforated sheet 150 to remain in the required position, it can be locked, for example, by a locking like the one indicated in FIG. 5, obtained by means of a vertical fixing sheet 160, which elastically deforms the horizontal perforated sheet 150.

In addition to the ways of implementing the invention, as described above, it should be understood that numerous further variations exist. It must also be understood that said methods of implementation are only exemplary and do not limit the object of the invention, neither its applications, nor its possible configurations. On the contrary, although the above description makes it possible for the skilled man to implement the present invention at least according to one of its exemplary configurations, it must be understood that numerous variations of the described components are conceivable, without thereby departing from the object of the invention, as defined in the attached claims.

The invention claimed is:

1. An air condenser (100) suitable for an organic Rankine cycle plant operated by a working fluid, comprising a two-pitch tube bundle (80), a support structure (110) which allows the inclined positioning of the tube bundle (80), an air duct (120) that passes through the tube bundle (80) and at least one fan (130) that sucks in the air to perform the heat exchange with the working fluid to be condensed, wherein:

- a first pitch (10) of the tube bundle (80), comprising a first plurality of tubes, condenses the working fluid up to a vapor content in any case greater than zero, and
- a second pitch (14) of the tube bundle (80), comprising a second plurality of tubes and having a first end (14') upstream and a second end (14") downstream, condenses only the residual vapor flow of the working fluid not condensed in the first pitch (10),
- said second pitch (14) is inclined upwards and allows the extraction through its second end (14") of incondensable gases present in the working fluid,
- at least one exchange tube (140) of the second plurality of tubes of the second pitch (14) is provided with a cross section (141), transversal to the axis of an exchange tube (140) of the second pitch (14), located in the lower part of the exchange tube (140), in which section (141) the liquid is collected,
- wherein said cross section (141) is that of a small draining tube (145) positioned along the axial direction with respect to the exchange tube (140) inserted in the exchange tube (140) and resting on the exchange pipe (140),
- and wherein said small draining tube (145) is provided with an opening (148) at the point of tangency between the exchange tube (140) and the small draining tube (145), to allow the condensate to enter.

2. The condenser (100) according to claim 1, wherein the second pitch (14) is located above the first pitch (10), on a position parallel to the position of the first pitch (10).

3. The condenser (100) according to claim 1, wherein the second pitch (14) is located in a position below the first pitch (10), on a position parallel to the position of the first pitch (10).

4. The condenser (100) according to claim 1, in which the second pitch (14), main pitch, is located in a position below the first pitch (10), parallel to the position of the first pitch (10), and a second pitch (114), auxiliary and partial, is located in parallel to the upper row of the first pitch (10).

5. The condenser (100) according to claim 1, wherein downstream of the second end (14") of the second pitch (14), the tube bundle (80) comprises a manifold (15) positioned at the highest point of the tube bundle (80) and suitable for accumulating the incondensable gases which have a lower density than the density of the vapor of the working fluid.

6. The condenser (100) according to claim 1, in which in the second pitch (14) the flow rate of the condensed residual liquid of the working fluid flows downwards by gravity falling into an outlet manifold (12).

7. The condenser (100) according to claim 6, wherein the tube bundle (80) comprises at least one opening (13) downstream of the outlet manifold (12) which allows the drainage of all the liquid phase of the working fluid.

8. The condenser claim 1, wherein the small draining tube (145) comprises a first portion (146) inserted in the exchange tube (140) and which ends at one end (140') of the exchange tube (140) and a second portion (147), continuous with respect to the first portion, which starts at the end (140') of the exchange tube (140) and ends under the liquid head of a condensate collector (13*a*).

9. The condenser (100) according to claim 8, in which the opening (148) is present only in the first portion (146) of the small draining tube (145).

10. The condenser (100) according to claim 8, wherein the small draining tube (145) comprises a single portion inserted in the exchange tube (140), a portion having an axial length less than the axial length of the exchange tube (140).

11. The condenser (100) according to claim 10, wherein the small draining tube (145) is integral, directly or by means of an internal structure, to the walls of the condensate collector (13*a*).

12. The condenser (100) according to claim 1, wherein the cross section (141) is delimited by a thin draining sheet (150), which separates the condensed residual liquid flow of the downhill flowing working fluid from the residual vapor flow of the uphill flowing working fluid.

13. The condenser (100) according to claim 12, wherein the thin draining sheet is a perforated thin sheet (150) accommodated in the exchange tube (140), in a horizontal position.

14. The condenser (100) according to claim 13, wherein a vertical fixing plate (160) elastically deforms the perforated thin sheet (150), locking it inside the exchange tube (140).

* * * * *